United States Patent

(12) United States Patent
Pascual

(10) Patent No.: US 12,517,747 B2
(45) Date of Patent: Jan. 6, 2026

(54) PROCESS ISOLATION USING VIRTUAL MACHINE MONITOR TOOLS TO DYNAMICALLY ALLOCATE COMPACT VIRTUAL MACHINES

(71) Applicant: Red Hat, Inc., Raleigh, NC (US)

(72) Inventor: Sergio Lopez Pascual, Madrid (ES)

(73) Assignee: Red Hat, Inc., Raleigh, NC (US)

( * ) Notice: Subject to any disclaimer, the term of this patent is extended or adjusted under 35 U.S.C. 154(b) by 428 days.

(21) Appl. No.: 17/082,707

(22) Filed: Oct. 28, 2020

(65) Prior Publication Data
US 2022/0129293 A1  Apr. 28, 2022

(51) Int. Cl.
G06F 9/455 (2018.01)

(52) U.S. Cl.
CPC ........... G06F 9/45558 (2013.01); G06F 2009/45583 (2013.01); G06F 2009/45591 (2013.01)

(58) Field of Classification Search
CPC ............ G06F 9/45558; G06F 2009/45591
See application file for complete search history.

(56) References Cited

U.S. PATENT DOCUMENTS

| | | | | |
|---|---|---|---|---|
| 8,219,653 B1* | 7/2012 | Keagy | ................ | G06F 9/45537 718/1 |
| 9,886,303 B2 | 2/2018 | Koler Jemio et al. | | |
| 2014/0380308 A1* | 12/2014 | Hassine | ............. | G06F 9/45558 718/1 |
| 2015/0067220 A1* | 3/2015 | Schwach | ................ | G06F 13/24 710/269 |
| 2016/0380807 A1* | 12/2016 | Shevenell | ............ | H04L 41/082 370/254 |
| 2018/0212875 A1* | 7/2018 | Zhu | ........................ | H04L 45/54 |
| 2018/0232519 A1* | 8/2018 | Lin | ...................... | H04L 9/0894 |
| 2019/0004868 A1* | 1/2019 | Zhou | ........................ | G06T 1/20 |
| 2020/0097370 A1* | 3/2020 | Srinivasan | ......... | G06F 11/1469 |
| 2020/0133791 A1* | 4/2020 | Liu | ......................... | G06F 16/13 |

(Continued)

OTHER PUBLICATIONS

Firecracker, Secure and fast microVMs for serverless computing; https://firecracker-microvm.github.io; retrieved on Sep. 1, 2020 (8 pages).

(Continued)

Primary Examiner — Lewis A Bullock, Jr.
Assistant Examiner — Kevin X Lu
(74) Attorney, Agent, or Firm — Kilpatrick Townsend & Stockton LLP

(57) ABSTRACT

A system includes a host including a memory and a processor, where the processor is in communication with the memory. A compact virtual machine (VM) executes on the host executing a first application in an isolated context. The processor is configured to receive a request to modify an operating characteristic of an operating environment of the compact VM. An interface to virtual machine monitor (VMM) tools is accessed, where the VMM tools are operable to communicate with compact VMs executing on the host. Each of the compact VMs executing on the host is associated with an identification and the VMM tools are incorporated into a second application interfacing with the compact VM. Access to the compact VM is requested via the interface, where the compact VM is associated with the compact VM ID. The operating characteristic of the compact VM are modified.

20 Claims, 9 Drawing Sheets

(56) References Cited

U.S. PATENT DOCUMENTS

| | | | |
|---|---|---|---|
| 2020/0183724 A1* | 6/2020 | Shevade | G06F 9/5016 |
| 2020/0249975 A1* | 8/2020 | Shankara Murthy | H04L 41/40 |
| 2021/0019170 A1* | 1/2021 | Sugano | G06F 11/07 |

OTHER PUBLICATIONS

Akshay Sharma et al., "CloudBox—A Virtual Machine Manager for KVM based virtual Machines", Oct. 2016, 2nd International Conference on Next Generation Computing Technologies, IEEE Xplore, downloaded on Sep. 5, 2023, 7 pages.

* cited by examiner

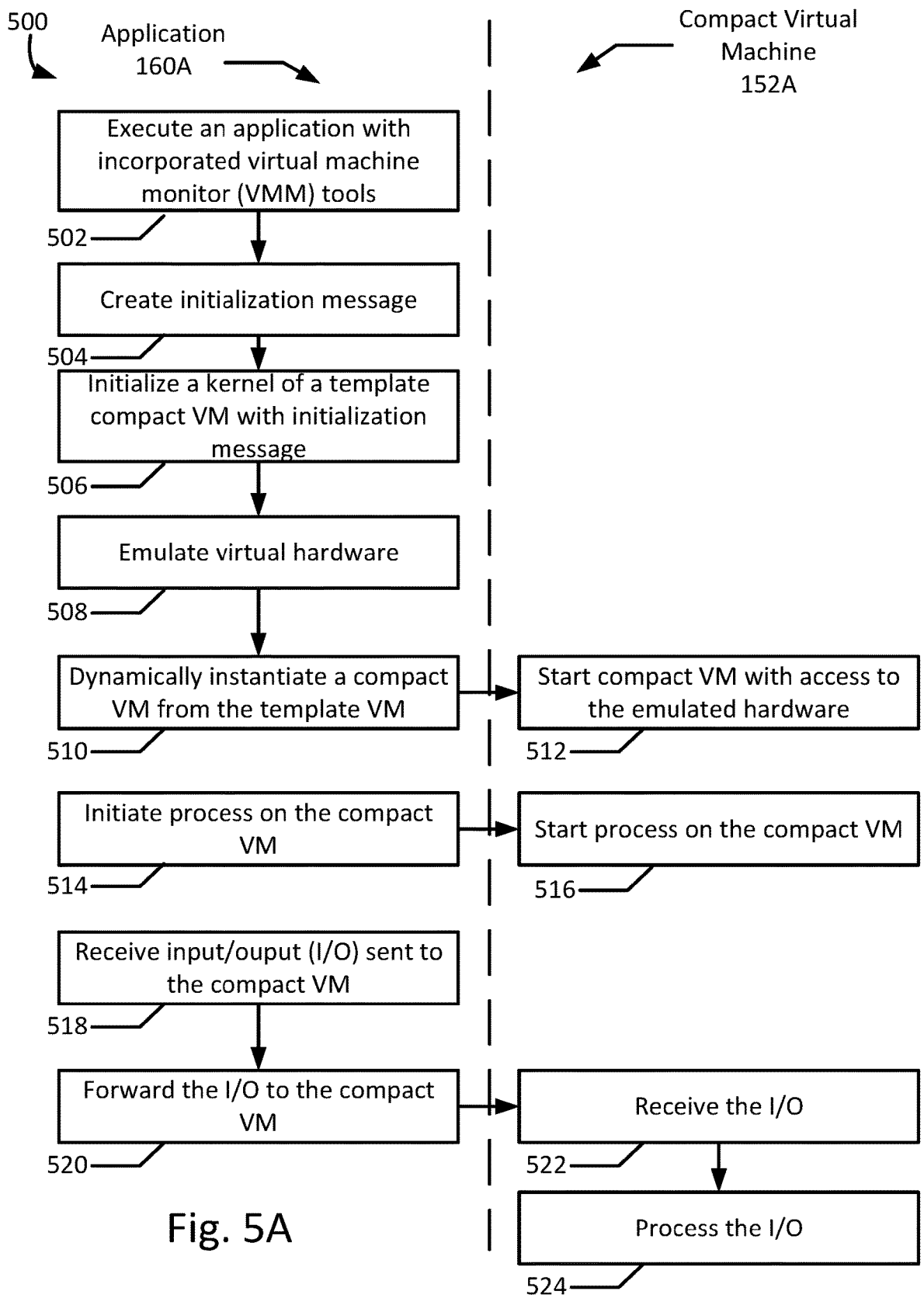

PROCESS ISOLATION USING VIRTUAL MACHINE MONITOR TOOLS TO DYNAMICALLY ALLOCATE COMPACT VIRTUAL MACHINES

BACKGROUND

A virtual machine is software that is executed on hardware to create a virtualization of a physical computer system. Virtual machines may function as self-contained platforms that run their own operating systems and software applications. A host machine, such as a server computer may concurrently run one or more virtual machines using a hypervisor. The hypervisor allocates a certain amount of the host's resources, such as the host's underlying physical processors and memory devices, to each of the virtual machines, allowing the virtual machines to transparently access the host's resources. Each virtual machine may use the allocated resources to execute applications, including operating systems referred to as guest operating systems. Each guest operating system may be accessed by one or more local or remote clients to perform computing tasks.

SUMMARY

The present disclosure provides new and innovative systems and methods for providing process isolation using a dynamic virtual machine monitor (VMM) library to create and/or manage a customized virtual machine and associated tools. In an example, a system includes a host including a memory and a processor, where the processor is in communication with the memory. A compact virtual machine (VM) executes on the host, where the compact VM is executing a first application in an isolated context. The processor is configured to receive a request to modify an operating characteristic of an operating environment of the compact VM, where the request includes an compact VM identification (ID) and where the operating characteristic affects access rights to the host by the compact VM. An interface to virtual machine monitor (VMM) tools is accessed, where the VMM tools are operable to communicate with compact VMs executing on the host. Each of the compact VMs executing on the host is associated with an identification and the VMM tools are incorporated into a second application interfacing with the compact VM. Access to the compact VM is requested via the interface, where the compact VM is associated with the compact VM ID. The operating characteristic of the compact VM are modified.

In an example, a method includes receiving a request to modify an operating characteristic of an operating environment of a compact VM. The request includes a compact VM identification (ID) and the operating characteristic affects access rights to a host by the compact VM. An interface to virtual machine monitor (VMM) tools is accessed, where the VMM tools are operable to communicate with compact VMs executing on the host. Each of the compact VMs executing on the host is associated with an identification and the VMM tools are incorporated into an application interfacing with the compact VM. Access to the compact VM is requested via the interface, where the compact VM is associated with the compact VM ID. The operating characteristic of the compact VM is modified.

In an example, a system includes a memory and a processor, where the processor is in communication with the memory. The processor is configured to execute an application with virtual machine monitor (VMM) tools incorporated into the application, where the application includes at least one variable defining an operating environment. Next, a kernel is initialized and embedded in a compact virtual machine (VM) based on the at least one variable. Next, the compact VM is dynamically instantiated via the VMM tools, where at least a portion of the application executes within the compact VM.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

FIGS. 5A and 5B are flow diagrams of example method of dynamically creating, managing, and/or modifying a compact virtual machine using virtual machine monitor tools according to an example embodiment of the present disclosure.

DETAILED DESCRIPTION

Techniques are disclosed for providing a capability to dynamically create, manage and/or communicate with a customized compact virtual machine to isolate one or more processes on demand. Typically, virtual machines can support execution of applications and/or processes with strong security and isolation boundaries between workloads. However, generally, current implementations of virtual machines require high overhead server applications installed on each node hosting virtual machines which sometimes may require complex configuration of the server applications and virtual machines themselves. Conventionally, industry would benefit from innovations that could provide a lightweight implementation of virtual machines.

As described in various examples disclosed herein, to facilitate dynamically creating compact virtual machines, systems and methods disclosed herein advantageously provide virtual machine monitor tools available to be incorporated into an application to provide lightweight tools to create, customize, and manage compact VMs for processes and/or applications that may benefit from workload isolation. In many examples, a virtual machine monitor (VMM) tool may be a library that may be incorporated into an application. The VMM tool provides a dynamic library that bundles VMM capabilities coupled with a template compact VM and an embedded kernel that may be easily configured and consumed by applications, processes, and/or services. For example, on a server without virtual machine capabilities, an application may dynamically create its own compact virtual machine. Alternatively, in another example, an application may have total control over its own virtual machines without having to rely on a server's installation of a hypervisor and/or virtual machine monitor.

In most instances, an application incorporating a VMM tool may be able to dynamically instantiate a template compact VM to create a compact VM, where the application manages inputs/outputs (I/Os), via the VMM tool, to and from the compact VM. The template compact VM is a base image of a virtual machine that is preconfigured with a minimal operating system and an embedded kernel. Both the template compact VM and/or the embedded kernel may be customized and configured to create into a compact VM streamline a single application, service, or process (e.g., a web server). A compact VM may be configurable to consume a comparable amount of resources to a container, however, the compact VM retains access to its own operating system (OS), established management tools, and established security tools, which may be unavailable to containers. The VMM tool may make an interface for creating, customizing and/or managing a compact virtual machine (VM) accessible without requiring that a VMM or hypervisor be installed or locally accessible.

Figure 1:
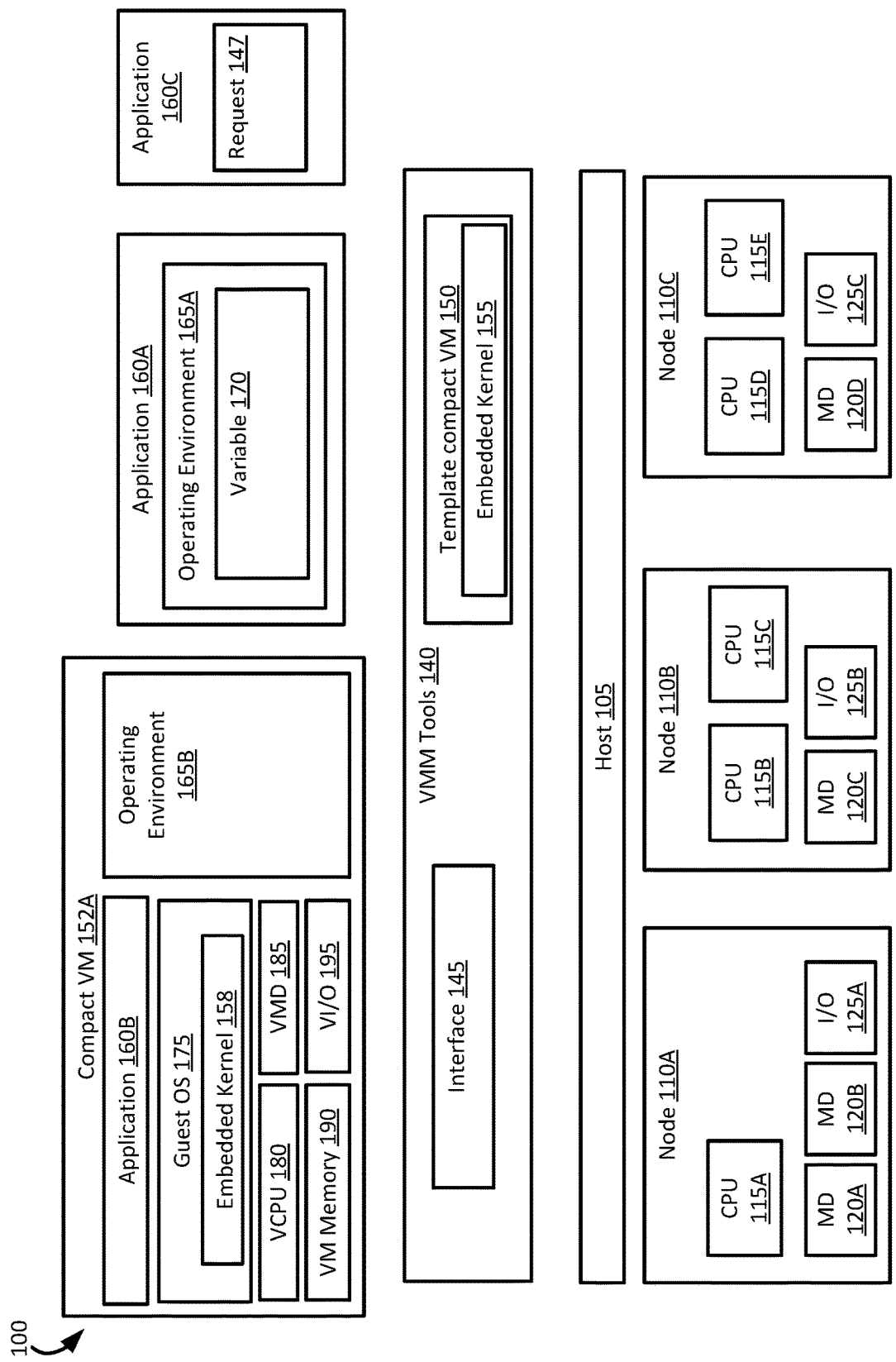
FIG. 1 illustrates a high level component diagram of an example computing system in accordance with one or more aspects of the present disclosure.

FIG. 1 depicts a high-level component diagram of an example computing system 100 in accordance with one or more aspects of the present disclosure. The computing system 100 may include a host 105 and nodes (110A-C, 110 generally). The host 105 or nodes 110 may be executing application 160A which may create, customize and/or manage compact virtual machine 152A. For example, an application 160A may be configured to execute a legacy application (e.g., application 160B) where the Guest OS 175 is different from an OS running on either the host 105 or node 110. In this example, the application 160A may access VMM tools 140 using interface 145 to gain access to libraries and/or utilities to create, manage, and/or customize template compact VM 150 and/or embedded kernel 155 to dynamically create a compact VM (e.g., compact VM 152A) to execute the legacy application (e.g., application 160B). In another example, application 160A manages inputs/outputs to and from compact VM 152 via the VMM tools 140. In at least one example, the application 160A may receive requests 147 from an external application (e.g., application 160C) to modify an operating characteristic of the operating environment 165B.

A compact virtual machine (VM) may include a virtual machine memory (VM Memory), a virtual CPU (VCPU), virtual memory devices (VMD), and virtual input/output devices (VI/O). For example, compact virtual machine 152A may include virtual machine memory 190, a virtual CPU 180, a virtual memory devices 185, and a virtual input/output device 195. In an example, Applications 160A-C may be different applications or services. In another example, applications 160A-C may be different instances of the same application or service.

In an example, a compact virtual machine 152A may execute a guest operating system 175 and run application 160B which may utilize the underlying VCPU 180, VMD 185, and VI/O device 195. Compact VM 152A is a lightweight virtual machine that may be streamlined, have one or more standard libraries removed and/or have access to a customized amount of resources based on performance requirements and/or operating environment 165 of application 160B.

A compact virtual machine (e.g., compact VM 152A, as illustrated in FIG. 1) may run on any type of dependent, independent, compatible, and/or incompatible applications on the underlying hardware and operating system ("OS"). In an example, applications (e.g., App 160B) run on a virtual machine 152A may be dependent on the underlying hardware and/or OS. In an example, Application 160B run on a compact virtual machine 152A may be compatible with the underlying hardware and/or OS. In an alternate example, applications 160B run on a compact virtual machine 152a may be incompatible with the underlying hardware and/or OS. In an example, compact VM 152A may be executing applications or services, such as microservices. In an example, the compact VM 152A may run a container including a process or service, where the container may be any execution environment.

The computer system 100 may include one or more nodes 110A-C. Each node 110A-C may in turn include one or more physical processors (e.g., CPU 115A-E) communicatively coupled to memory devices (e.g., MD 120A-D) and input/output devices (e.g., I/O 125A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc.

As used herein, physical processor or processor 115A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 120A-D refers to a volatile or non-volatile memory device, such as RAM, ROM, EEPROM, or any other device capable of storing data. As discussed herein, I/O device 125A-C refers to a device capable of providing an interface between one or more processor pins and an external device capable of inputting and/or outputting binary data.

Processors (e.g., CPUs 115A-E) may be interconnected using a variety of techniques, ranging from a point-to-point processor interconnect, to a system area network, such as an Ethernet-based network. Local connections within each node, including the connections between a processor 115A-E and a memory device 120A-D may be provided by one or more local buses of suitable architecture, for example, peripheral component interconnect (PCI).

Figure 2A:
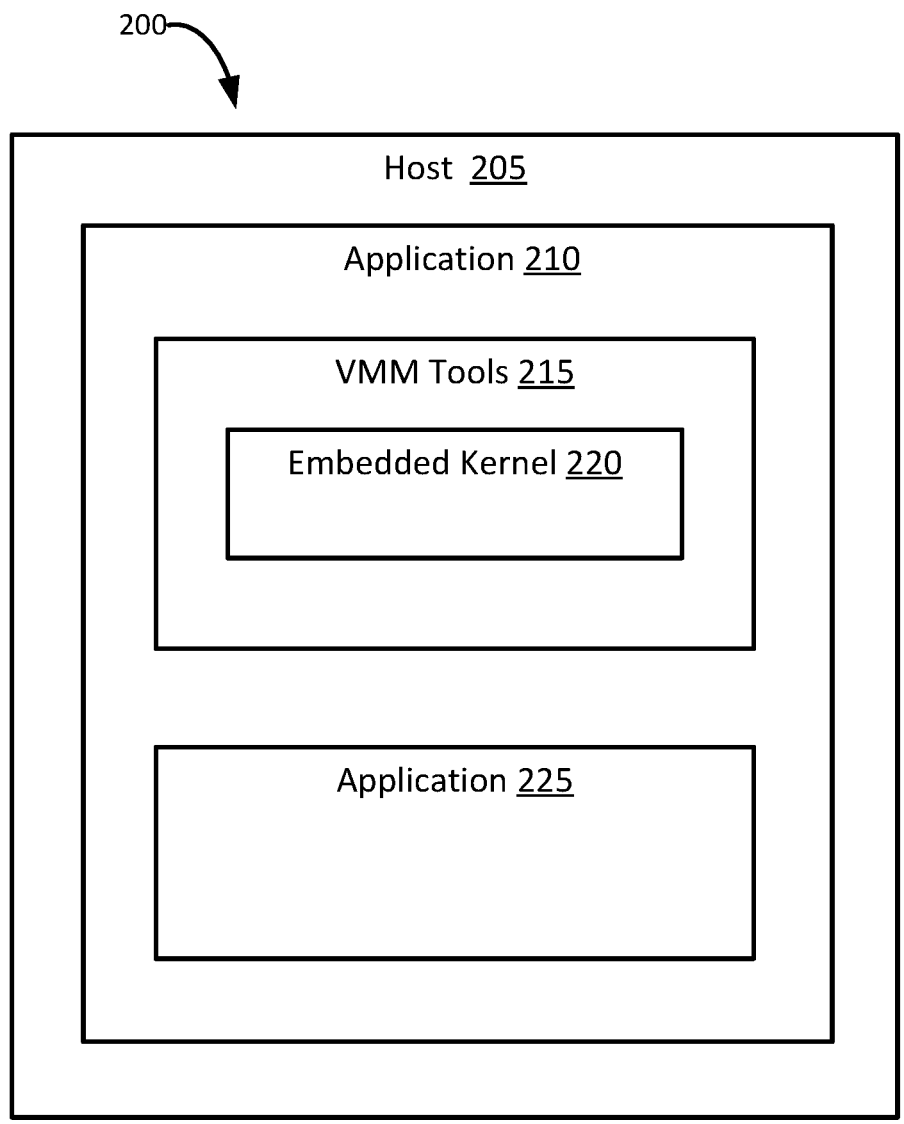
FIGS. 2A and 2B illustrate a component diagram of a first state and a second state of an application dynamically creating a compact virtual machine using virtual machine monitor tools in accordance with one or more aspects of the present disclosure.
Figure 2B:
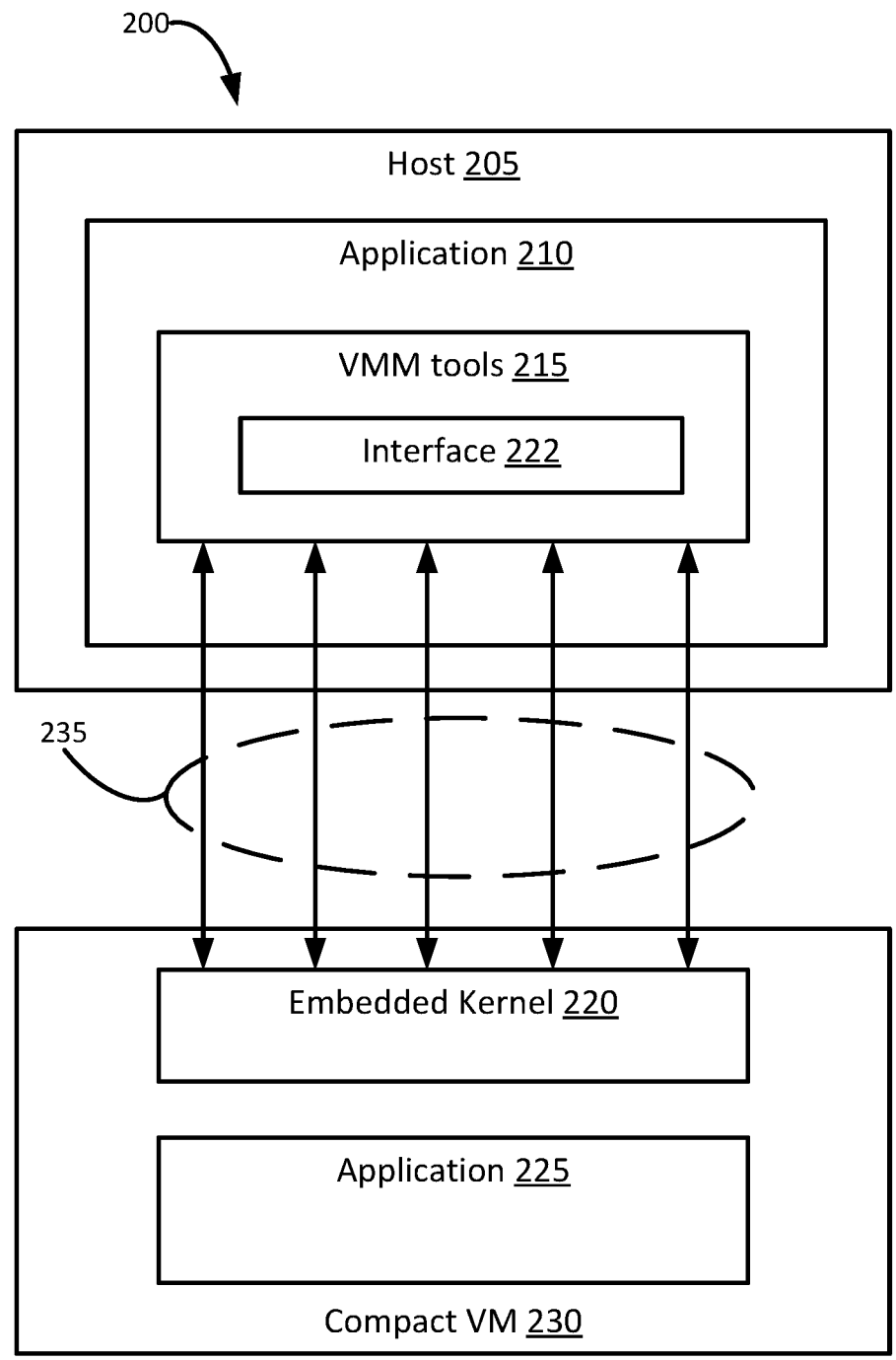

FIGS. 2A and 2B illustrate component diagrams of an example computing system dynamically instantiating a compact VM in accordance with one or more aspects of the present disclosure. As shown in FIG. 2A, host 205 is in a first state where it is executing application 210. In the state shown in FIG. 2A, application 210 includes VMM tools 215 and application 225. For example, host 205 may not include a hypervisor, VMM, and/or virtual machine tools, but the application 210 is attempting to instantiate a web server (e.g., application 225) in an isolated context in a virtual environment. In this instance, Application 210 is still able to create a compact VM to execute the web server (i.e., application 225) using VMM tools 215. In some examples, application 210 may incorporate application 225 within application 210. In other examples, application 210 may have a location, link, and/or shortcut to application 225, where application 210 can call application 225 when required.

FIG. 2B shows a second state of host 205 where the application 210 has dynamically instantiated compact virtual machine (VM) 230. Application 210 initialized and/or customized the embedded kernel 220 and instantiated compact VM 230 with the embedded kernel 220. The compact VM 230, as shown in FIG. 2B, is executing application 225. For example, compact VM 230 may be a test sandbox for application 225, where the compact VM 230 has limited resources and limited communication with anything outside of compact VM 230. In this example, the application 225 has limited ability to access any physical resources and/or affect the host 205. In the second state, the application 210 communicates with the compact VM 230 using interface 222, accessible through VMM tools 215, to send I/Os and/or other messages through communication channels 235. In the second state shown in FIG. 2B, the application can further configure and/or modify the embedded kernel 220 and/or compact VM 230 via configuration messages sent using the interface 222 through communication channels 235. In another example, any inputs/outputs (I/Os) received by application 210 for application 225 may be sent via the interface 222 through the communication channels 235 to application 225. For example, if application 225 is a web server, web page requests sent to the compact VM 230 are managed by the VMM tools 215 within the application 210. Similarly, outputs from the compact VM 230 are sent to the network via the application 210 (e.g., content from a web page).

Figure 3:
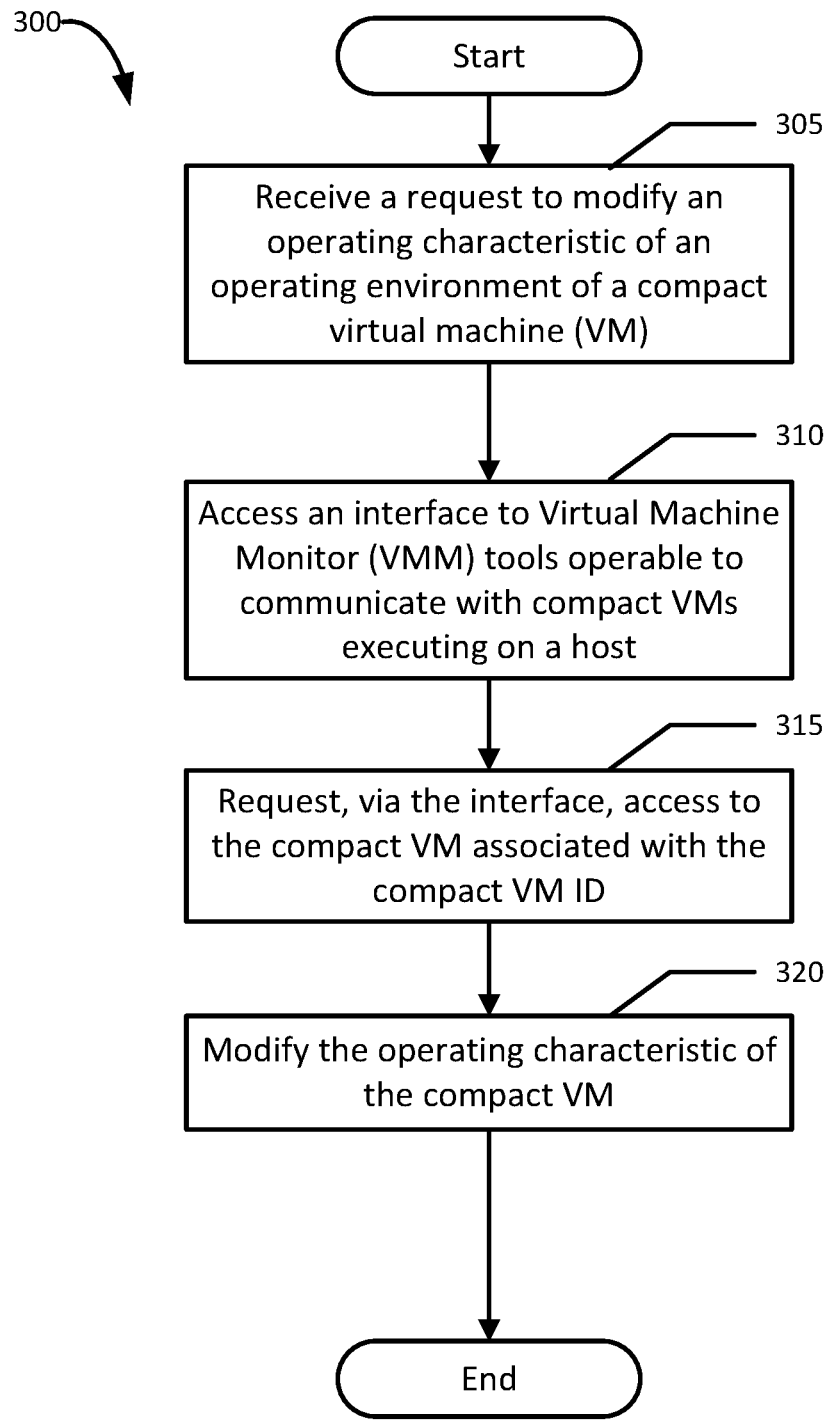
FIG. 3 illustrates a flowchart of an example method of modifying a compact virtual machine through an interface accessible from a virtual machine monitor tools according to an example embodiment of the present disclosure.

FIG. 3 illustrates a flowchart of an example method of communicating with a device, in accordance with an embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, blocks may be repeated and some of the blocks described are optional. The method 300 may be performed by processing logic that may comprise hardware (circuitry, dedicated logic, etc.), software, or a combination of both.

As shown in FIG. 3, an example method 300 may begin with receiving a request to modify an operating characteristic of an operating environment of a compact virtual machine (VM) (block 305). The request may include a compact VM identification (ID) and the operating characteristics may affect access rights to a host by the compact VM. For example, application 160A is executing on host 105 and has instantiated compact VM 152A using VMM tools 140. Application 160C sends a request 147 to application 160A to modify an operating characteristic of the operating environment 165B. In this instance, application 160C may want to modify a resource footprint of the compact 152A and sends the request 147 to indicate to application 160 how resource management of compact VM 152A should change.

Next, the example method 300 may include accessing an interface to virtual machine monitor (VMM) tools operable to communicate with compact VMs executing on a host (block 310). In this instance, each compact VM executing on the host is associated with an ID and the VMM tools are incorporated into the application interfacing with the compact VM. For example, application 160A incorporates the VMM tools 140 such that the interface 145 and template compact VM 150 are available to be accessed by the application 160A. The application 160A accesses the interface 145 to communicate with compact VM 152. Next, the example method 300 may include requesting, via the interface, access to the compact VM associated with the compact VM ID (block 315). For example, the compact VM 152A is able to be identified using a compact VM ID. The application 160A is able to request access to the compact VM 152A from the interface 145 of the VMM tools 140 using a compact VM ID. Next, the example method 300 may include modifying the operating characteristics of the compact VM (block 320). For example, the application 160A may modify an operating environment 165B of the compact VM 152A through the interface 145 based on the request 147. In one instance, a request 147 may be associated with resources on the host 105 or nodes 110 available to the compact VM 152A. In another example, the request 147 may be associated with a service executing on the compact VM 152A. In yet another example, the request 147 may be associated with modifying a mount-namespace and/or network namespace for the compact VM 152A.

Figure 4:
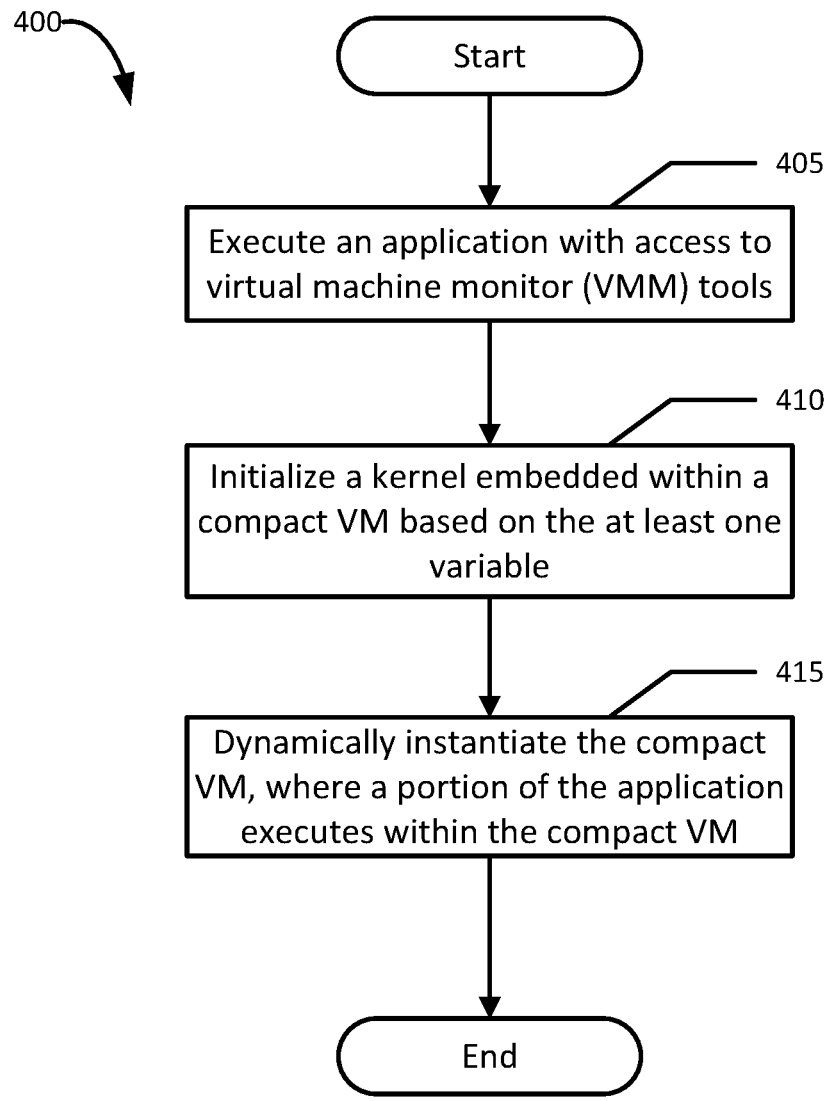
FIG. 4 illustrates a flowchart of an example method of dynamically creating a compact virtual machine according to an example embodiment of the present disclosure.

FIG. 4 illustrates a flowchart of an example method of communicating with a device, in accordance with an embodiment of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, blocks may be repeated and some of the blocks described are optional. The method 400 may be performed by processing logic that may comprise hardware (circuitry, dedicated logic, etc.), software, or a combination of both.

As shown in FIG. 4, an example method 400 may begin with executing an application with access to virtual machine monitor (VMM) tools (block 405). The application may include at least one variable defining an operating environment. For example, an application 160A may incorporate VMM tools 140 to provide the capability to dynamically create, customize, and/or manage a compact VM 152A. The application 160A may be able to customize the compact VM 152A to operate using an operating environment 165B based on the operating environment 165A, stored within the application 160A, which includes at least one defined variable 170. For example, a variable 170 may include an amount of storage required for the application 160B. Alternatively, in another example, a variable 170 may include an amount of processing power allocated to compact VM 152A. Next, the example method 400 may initialize a kernel embedded within a compact VM based on the at least one variable (block 410). For example, application 160A communicates with the VMM tools 140 using interface 145 to customize compact VM 152A using template compact VM 150. The application 160A may modify the embedded kernel 155 according to the operating environment 165A, which includes variable 170. The operating environment 165A is specifically customized for application 160B to operate within compact VM 152A. In one example, an embedded kernel 155 may be customized to allocate a specific amount of resources towards execution of an application 160B running in the compact VM 152A. In another example, an application 160A may configure an embedded kernel 158 to include libraries specific to the application 160B. In yet another example, an application 160A may configure an embedded kernel 158 to remove libraries unused by the application 152A from the embedded kernel 158. In an example, the variable 170 may be associated with the operating environment 165B of the compact VM 152A required for the application 160B (e.g., location of the application, root file system, etc.).

In yet another example, an application (e.g., 160B) may be specifically designed to process complex calculations. For that purpose, the compact VM does not require a web server and/or user services to be installed in the guest OS 175 and they may be removed to reduce the footprint of and/or streamline the compact VM. However, the application may benefit from increased access to hardware resources depending on a priority and/or importance of making the calculations, which may be adjusted as required.

Next the example method 400 may dynamically instantiate the compact VM, where a portion of the application executes within the compact VM (block 415). For example, the application 160A accesses the interface 145 within VMM tools 140 to dynamically instantiate the compact VM 152A using the template compact VM 150. The application 160A may execute application 160B within the compact VM 152A. In one example, the application 160A may include the application 160B within application 160A. In another example, application 160A may store a link and/or location of application 160B that may be used to execute the application 160B within the compact VM 152A. In yet another example, application 160A may spawn, fork, and/or create a process that runs within compact VM 152A as application 160B. In another example, once the compact VM 152A is instantiated, the VMM tools 140 emulate virtual hardware accessed by the compact VM 152A and negotiate usage of physical hardware from the host 105 and/or nodes 110. In another example, inputs/outputs (I/Os) received at the compact VM 152A via the application 160A and the interface 145 are processed by the application 160B. Alternatively, I/Os sent from the compact VM 152A are sent through the interface 145 via the application 160A to the network (e.g., other hosts, nodes, VMs, devices, on a network). In most instances, use of mount-namespace and network namespace is transparent such that a compact VM (e.g., compact VM 152A) may be shown as located within a host 105, node 110, or as a separate node or entity on a network.

Figure 5B:
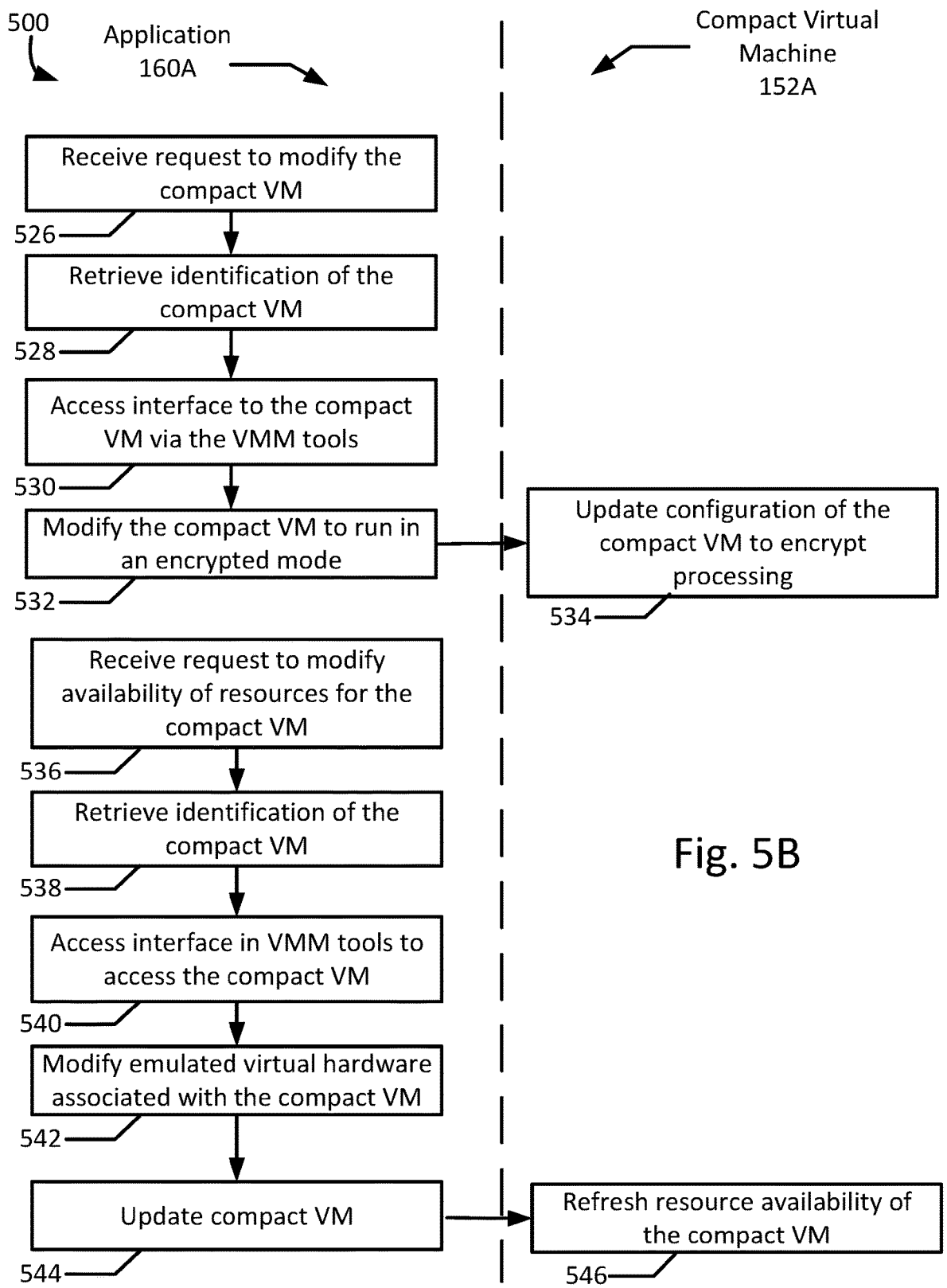

FIGS. 5A and 5B illustrates a flow diagram of an example methods of an application instantiating and communicating with a compact virtual machine, in accordance with an embodiment of the present disclosure. Although the example method 500 is described with reference to the flow diagrams illustrated in FIGS. 5A and 5B, it will be appreciated that many other methods of performing the acts associated with the method 500 may be used. For example, the order of some of the blocks may be changed, certain blocks may be combined with other blocks, blocks may be repeated, and some of the blocks described are optional. For example, in the illustrated flow diagram, an application 160A executing on a host 105 or node 110 is instantiating and/or communicating with compact virtual machine 152A.

As shown in FIG. 5A, the application 160A executes with the VMM tools 140 incorporated within the application 160A (block 502). The application 160A creates an initialization message (block 504). For example, an initialization message may include a root file system for the isolated context. The initialization message may include a binary to be executed within the compact VM 152A. The initialization message may include an operating characteristic or variable 170 of an operating environment 165A of that will be created in the compact VM 152A. The application 160A initializes an embedded kernel 155 from the template compact VM 150 with the initialization message (block 506). For example, the compact VM 152A and embedded kernel 158 are based off the template compact VM 150 and embedded kernel 155 stored within the VMM tools 140. In one example, an application 160A may create two or more compact VMs based off the template compact VM 150. The application 160A communicates with the VMM tools 140 through the interface 145 to start emulating virtual hardware (block 508). For example, the VMM tools 140 emulate virtual hardware based on physical hardware available from the Host 105 and/or nodes 110. In various instances, the application 160A may direct the VMM tools 140 to increase an amount of available resources accessible by the compact VM 152A. In other instances, the application 160A may direct the VMM tools 140 to restrict and/or reduce an amount of available resources accessible by the compact VM 152A.

Next, the application 160A dynamically instantiates a compact VM 152A from the template compact VM 150 (block 510). Once the compact VM 152A starts, it has access to emulated hardware (block 512). The application 160A initiates a process and/or application 160B on the compact VM 152A (block 514). In some instances, a compact VM 152A may automatically start a process and/or application 160B upon instantiation. In other instances, a compact VM 152A may receive a location of an application, or the application itself, and start executing the application after instantiation. The compact virtual machine 152A starts the process or application 160B on the compact VM 152A (block 516). During operation of the compact VM 152A, the application 160A receives inputs/outputs (I/Os) sent to the compact VM 152A (block 518). The application 160A then forwards the I/Os to the compact VM 152A via the interface 145 of the VMM tools 140 (block 520). Upon receiving the I/Os from the interface 145 of the VMM tools 140 (block 522), the compact VM 152A processes each received I/O (block 524). Alternatively, any I/Os sent from the compact VM 152A are sent through the VMM tools 140 to the application 160A, where they are sent out through the network.

As shown in FIG. 5B, periodically the application 160A receives requests to modify the compact VM 152A (block 526). The application 160A retrieves an identification of the compact VM 152A (block 528). In some instances, the application 160A may store the ID of the compact VM 152A. In other instances, the application 160A may query the VMM tools 140 for the ID of compact VM 152A. Next, the application 160A accesses the interface 145 to the VMM tools 140 to access the compact VM 152A (block 530). In this instance, the application 160A modifies the compact VM 152A to run in encrypted mode (block 532). The compact VM 152A updates its configuration to encrypted processing based on instructions received from the application 160A (block 534).

Alternatively, an application 160A may receive a request 147 to modify availability of resources for the compact VM 152A (block 536). For example, an application 160C daemon, and/or agent may be optimizing resource usage on the host 105 and/or nodes 110. To increase resource efficiency, resource available to the compact VM 152A may be reduced based on requirements of the application 160B. The application 160A retrieves a compact VM ID from the request 147 and accesses the interface 145 of the VMM tools 140 to modify emulated hardware for the compact VM 152A (block 540). Next, the application 160A modifies the emulated virtual hardware associated with the compact VM 152A (block 542) and updates the compact VM 152A (block 544). Next, the compact VM 152A refreshes resource availability from emulated hardware for the compact VM 152A (block 546). For example, when resources for the compact VM 152A are modified, the compact VM 152A updates and/or refreshes connections between the compact VM 152A and the associated emulated hardware resources such that the compact VM 152A is using an appropriate amount of hardware resources.

Figure 6:
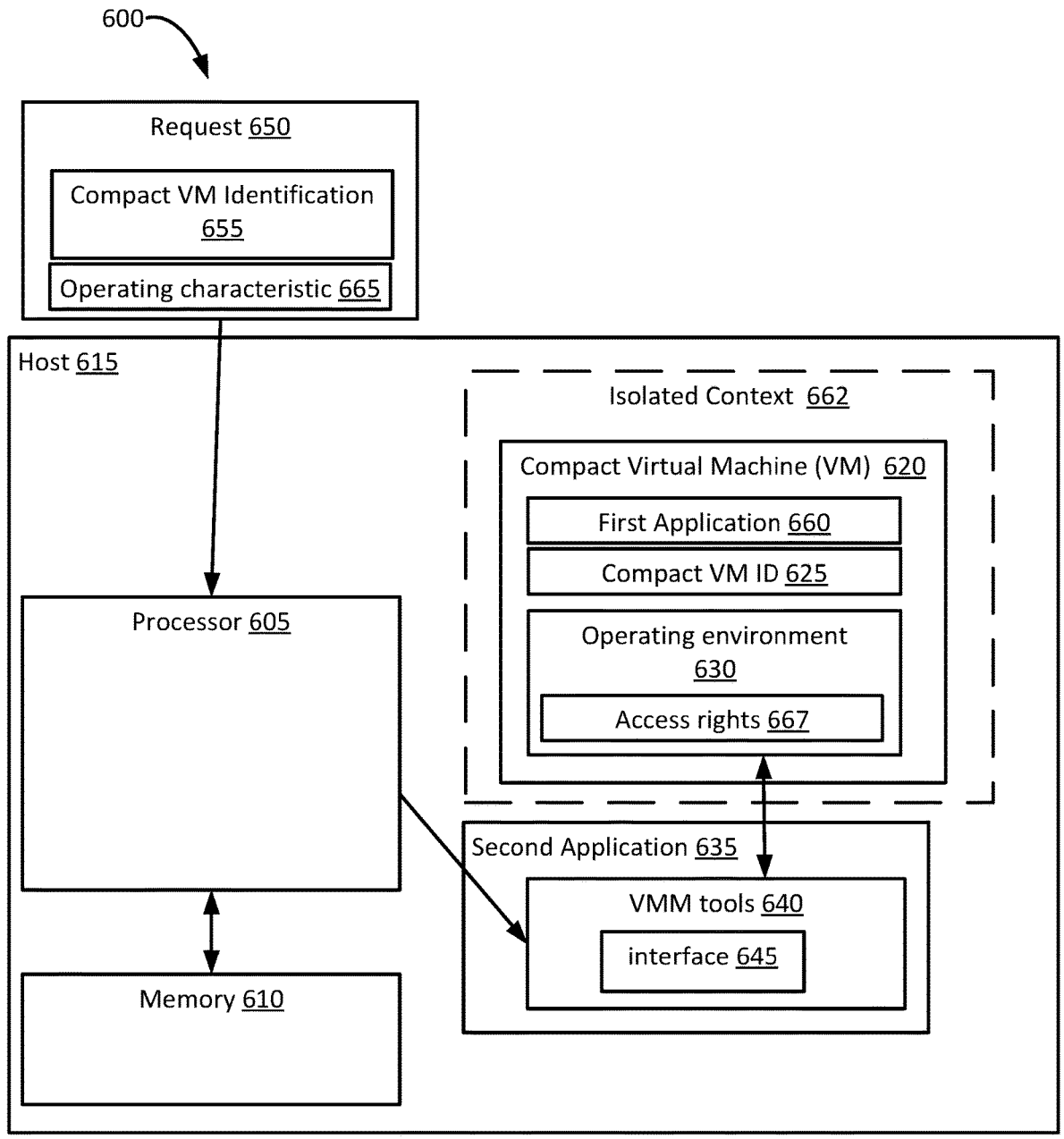
FIG. 6 illustrates a block diagram of an example system modifying a compact virtual machine through an interface accessible through virtual machine monitor tools according to an example embodiment of the present disclosure.

FIG. 6 is a block diagram of system 600 which includes a host 615 including a memory 610 and a processor 605. The processor 615 is in communication with the memory 610. A compact virtual machine (VM) 620 is executing on the host 615, where the compact VM 620 is executing a first application 660 in an isolated context 662. The processor 605 is configured to receive a request 650 to modify an operating characteristic 665 of an operating environment 630 of the compact VM 620. The request 650 includes a compact VM identification (ID) 655 and the operating characteristic 665 affects access rights 667 to the host 615 by the compact VM 620. An interface 645 to virtual machine monitor (VMM) tools 640 are accessed, where the VMM tools 640 are operable to communicate with compact VMs executing on the host 615. Each compact VM executing on the host 615 is associated with an identification 625. In this example, the VMM tools 640 are incorporated into a second application 635. Access to the compact VM 620 associated with the compact VM ID 655 is requested via the interface 645. Next, the operating characteristic 665 of the compact VM 620 is modified.

Figure 7:
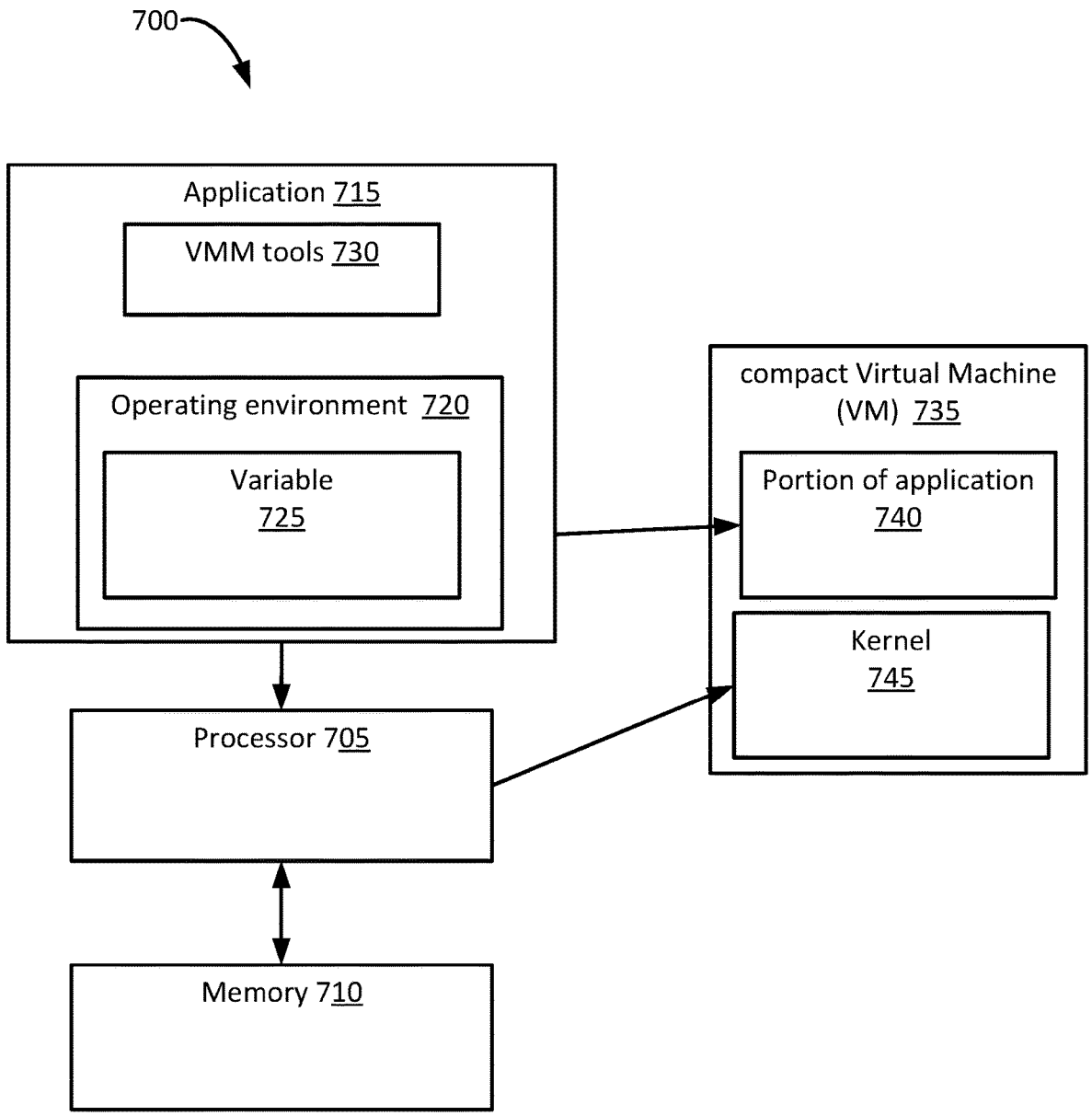
FIG. 7 illustrates a block diagram of an example system dynamically allocating a compact virtual machine according to an example embodiment of the present disclosure.

FIG. 7 is a block diagram of a system 700 which includes a memory 710 and a processor 705, where the processor is in communication with the memory 710. The processor 705 is configured to execute an application 715 with virtual machine monitor (VMM) tools 730 incorporated into the application 715. The application 715 includes at least one variable 725 defining an operating environment 720. A kernel 745 embedded in a compact virtual machine (VM) 735 is initialized based on the at least one variable 725. Next, the compact VM 735 is dynamically instantiated, via the VMM tools 730, where at least a portion of the application 740 executes within the compact VM 735.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more aspects described herein. In a 1st exemplary aspect of the present disclosure, a system includes a host including a memory and a processor, wherein the processor is in communication with the memory; and a compact virtual machine (VM) executing on the host, wherein the compact VM is executing a first application in an isolated context; wherein the processor is configured to receive a request to modify an operating characteristic of an operating environment of the compact VM, wherein the request includes an compact VM identification (ID), wherein the operating characteristic affects access rights to the host by the compact VM; access an interface to virtual machine monitor (VMM) tools operable to communicate with compact VMs executing on the host, wherein each of the compact VMs executing on the host is associated with an identification, wherein the VMM tools are incorporated into a second application interfacing with the compact VM; request, via the interface, access to the compact VM associated with the compact VM ID; and modify the operating characteristic of the compact VM.

In a 2nd exemplary aspect of the present disclosure, which may be used in combination with any one or more of the preceding aspects (i.e., the 1st aspect), where the operating characteristic is associated with resources on the host available to the compact VM.

In a 3rd exemplary aspect of the present disclosure, which may be used in combination with any one or more of the preceding aspects (i.e., the 1st aspect), where the operating characteristic is associated with a service executing on the compact VM.

In a 4th exemplary aspect of the present disclosure, which may be used in combination with any one or more of the preceding aspects (i.e., the 1st aspect), where the compact VM is operable to function without a virtual machine monitor installed on the host.

In a 5th exemplary aspect of the present disclosure, which may be used in combination with any one or more of the preceding aspects (i.e., the 1st aspect), where modifying the operating characteristic of the compact VM includes modifying a mount-namespace for the compact VM.

In a 6th exemplary aspect of the present disclosure, which may be used in combination with any one or more of the preceding aspects (i.e., the 1st aspect), where modifying the operating characteristic of the compact VM includes modifying a network-namespace for the compact VM.

In a 7th exemplary aspect of the present disclosure, which may be used in combination with any one or more of the preceding aspects (i.e., the 1st aspect), where modifying the operating characteristic of the compact VM includes modifying an amount of resources from the host available to be used by the compact VM.

Aspects of the subject matter described herein may be useful alone or in combination with one or more aspects described herein. In a 8th exemplary aspect of the present disclosure, a method includes receiving a request to modify an operating characteristic of an operating environment of a compact VM, wherein the request includes a compact VM identification (ID), wherein the operating characteristic affects access rights to a host by the compact VM; accessing an interface to virtual machine monitor (VMM) tools operable to communicate with compact VMs executing on the host, wherein each of the compact VMs executing on the host is associated with an identification, wherein the VMM tools are incorporated into an application interfacing with the compact VM; requesting, via the interface, access to the compact VM associated with the compact VM ID; and modify the operating characteristic of the compact VM.

In a 9th exemplary aspect of the present disclosure, which may be used in combination with any one or more of the preceding aspects (i.e., the 8th aspect), where the operating characteristic is associated with resources on the host available to the compact VM.

In a 10th exemplary aspect of the present disclosure, which may be used in combination with any one or more of the preceding aspects (i.e., the 8th aspect), where the operating characteristic is associated with a service executing on the compact VM.

In an 11th exemplary aspect of the present disclosure, which may be used in combination with any one or more of the preceding aspects (i.e., the 8th aspect), where the compact VM is operable to function without a virtual machine monitor installed on the host.

In a 12th exemplary aspect of the present disclosure, which may be used in combination with any one or more of the preceding aspects (i.e., the 8th aspect), where modifying the operating characteristic of the compact VM includes modifying a mount-namespace for the compact VM.

In a 13th exemplary aspect of the present disclosure, which may be used in combination with any one or more of the preceding aspects (i.e., the 8th aspect), where modifying the operating characteristic of the compact VM includes modifying a network-namespace for the compact VM.

In a 14th exemplary aspect of the present disclosure, which may be used in combination with any one or more of the preceding aspects (i.e., the 8th aspect), where modifying the operating characteristic of the compact VM includes modifying an amount of resources from the host available to be used by the compact VM.

Aspects of the subject matter described herein may be useful alone or in combination with one or more aspects described herein. In a 15th exemplary aspect of the present disclosure, a non-transitory machine readable medium storing code, which when executed by a processor is configured to receive a request to modify an operating characteristic of an operating environment of a compact VM, wherein the request includes a compact VM identification (ID), wherein the operating characteristic affects access rights to a host by the compact VM; access an interface to virtual machine monitor (VMM) tools operable to communicate with compact VMs executing on the host, wherein each of the compact VMs executing on the host is associated with an identification, wherein the VMM tools are incorporated into an application interfacing with the compact VM; request, via the interface, access to the compact VM associated with the compact VM ID; and modify the operating characteristic of the compact VM.

In a 16th exemplary aspect of the present disclosure, which may be used in combination with any one or more of the preceding aspects (i.e., the 15th aspect), where the operating characteristic is associated with resources on the host available to the compact VM.

In a 17th exemplary aspect of the present disclosure, which may be used in combination with any one or more of the preceding aspects (i.e., the 15th aspect), where the operating characteristic is associated with a service executing on the compact VM.

In an 18th exemplary aspect of the present disclosure, which may be used in combination with any one or more of the preceding aspects (i.e., the 15th aspect), where the compact VM is operable to function without a virtual machine monitor installed on the host.

In a 19th exemplary aspect of the present disclosure, which may be used in combination with any one or more of the preceding aspects (i.e., the 15th aspect), where modifying the operating characteristic of the compact VM includes modifying a mount-namespace for the compact VM.

In a 20th exemplary aspect of the present disclosure, which may be used in combination with any one or more of the preceding aspects (i.e., the 15th aspect), where modifying the operating characteristic of the compact VM includes modifying a network-namespace for the compact VM.

In a 21st exemplary aspect of the present disclosure, which may be used in combination with any one or more of the preceding aspects (i.e., the 15th aspect), where modifying the operating characteristic of the compact VM includes modifying an amount of resources from the host available to be used by the compact VM.

Aspects of the subject matter described herein may be useful alone or in combination with one or more aspects described herein. In a 22nd exemplary aspect of the present disclosure, a system includes a means for executing an application with virtual machine monitor (VMM) tools incorporated into the application, wherein the application includes at least one variable defining an operating environment; a means for initializing a kernel embedded in a compact virtual machine (VM) based on the at least one variable; and a means for dynamically instantiating, via the VMM tools, the compact VM, wherein at least a portion of the application executes within the compact VM.

Aspects of the subject matter described herein may be useful alone or in combination with one or more aspects described herein. In a 23rd exemplary aspect of the present disclosure, a system includes a memory; and a processor in communication with the memory, wherein the processor is configured to execute an application with virtual machine monitor (VMM) tools incorporated into the application, wherein the application includes at least one variable defining an operating environment; initialize a kernel embedded in a compact virtual machine (VM) based on the at least one variable; and dynamically instantiate, via the VMM tools, the compact VM, wherein at least a portion of the application executes within the compact VM.

In a 24th exemplary aspect of the present disclosure, which may be used in combination with any one or more of the preceding aspects (i.e., the 23rd aspect), where initializing comprises customizing the kernel according to resources allocated to the application; and embedding the kernel within the compact VM.

In a 25th exemplary aspect of the present disclosure, which may be used in combination with any one or more of the preceding aspects (i.e., the 24th aspect), where customizing the kernel comprises adding libraries specific to the application to the kernel.

In a 26th exemplary aspect of the present disclosure, which may be used in combination with any one or more of the preceding aspects (i.e., the 24th aspect), where customizing the kernel comprises removing libraries unused by the application from the kernel.

In a 27th exemplary aspect of the present disclosure, which may be used in combination with any one or more of the preceding aspects (i.e., the 23rd aspect), where a first variable of the at least one variable defining the operating environment of the application includes a root file system for the compact VM.

In a 28th exemplary aspect of the present disclosure, which may be used in combination with any one or more of the preceding aspects (i.e., the 23rd aspect), where a first variable of the at least one variable defining the operating environment of the application includes a location of the application.

In a 29th exemplary aspect of the present disclosure, which may be used in combination with any one or more of the preceding aspects (i.e., the 23rd aspect), where the application executes a microservice on the compact VM.

In a 30th exemplary aspect of the present disclosure, which may be used in combination with any one or more of the preceding aspects (i.e., the 23rd aspect), where the VMM tools emulate hardware accessed by the compact VM.

In a 31st exemplary aspect of the present disclosure, which may be used in combination with any one or more of the preceding aspects (i.e., the 23rd aspect), where inputs and outputs (I/Os) are sent to the compact VM via the VMM tools incorporated within the application.

Aspects of the subject matter described herein may be useful alone or in combination with one or more aspects described herein. In a 32nd exemplary aspect of the present disclosure, a method includes executing an application with virtual machine monitor (VMM) tools incorporated into the application, wherein the application includes at least one variable defining an operating environment; initializing a kernel embedded in a compact virtual machine (VM) based on the at least one variable; and dynamically instantiate, via the VMM tools, the compact VM, wherein at least a portion of the application executes within the compact VM.

In a 33rd exemplary aspect of the present disclosure, which may be used in combination with any one or more of the preceding aspects (i.e., the 32nd aspect), where initializing comprises customizing the kernel according to resources allocated to the application; and embedding the kernel within the compact VM.

In a 34th exemplary aspect of the present disclosure, which may be used in combination with any one or more of the preceding aspects (i.e., the 33rd aspect), where customizing the kernel comprises adding libraries specific to the application to the kernel.

In a 35th exemplary aspect of the present disclosure, which may be used in combination with any one or more of the preceding aspects (i.e., the 33rd aspect), where customizing the kernel comprises removing libraries unused by the application from the kernel.

In a 36th exemplary aspect of the present disclosure, which may be used in combination with any one or more of the preceding aspects (i.e., the 32nd aspect), where a first variable of the at least one variable defining the operating environment of the application includes a root file system for the compact VM.

In a 37th exemplary aspect of the present disclosure, which may be used in combination with any one or more of the preceding aspects (i.e., the 32nd aspect), where a first variable of the at least one variable defining the operating environment of the application includes a location of the application.

In a 38th exemplary aspect of the present disclosure, which may be used in combination with any one or more of the preceding aspects (i.e., the 32nd aspect), where the application executes a microservice on the compact VM.

In a 39th exemplary aspect of the present disclosure, which may be used in combination with any one or more of the preceding aspects (i.e., the 32nd aspect), where the VMM tools emulate hardware accessed by the compact VM.

In a 40th exemplary aspect of the present disclosure, which may be used in combination with any one or more of the preceding aspects (i.e., the 32nd aspect), where inputs and outputs (I/Os) are sent to the compact VM via the VMM tools incorporated within the application.

Aspects of the subject matter described herein may be useful alone or in combination with one or more aspects described herein. In a 41st exemplary aspect of the present disclosure, anon-transitory machine readable medium storing code, which when executed by a processor is configured to execute an application with virtual machine monitor (VMM) tools incorporated into the application, wherein the application includes at least one variable defining an operating environment; initialize a kernel embedded in a compact virtual machine (VM) based on the at least one variable; and dynamically instantiate, via the VMM tools, the compact VM, wherein at least a portion of the application executes within the compact VM.

In a 42nd exemplary aspect of the present disclosure, which may be used in combination with any one or more of the preceding aspects (i.e., the 41st aspect), where initializing comprises customizing the kernel according to resources allocated to the application; and embedding the kernel within the compact VM.

In a 43rd exemplary aspect of the present disclosure, which may be used in combination with any one or more of the preceding aspects (i.e., the 42nd aspect), where customizing the kernel comprises adding libraries specific to the application to the kernel.

In a 44th exemplary aspect of the present disclosure, which may be used in combination with any one or more of the preceding aspects (i.e., the 42nd aspect), where customizing the kernel comprises removing libraries unused by the application from the kernel.

In a 45th exemplary aspect of the present disclosure, which may be used in combination with any one or more of the preceding aspects (i.e., the 41st aspect), where a first variable of the at least one variable defining the operating environment of the application includes a root file system for the compact VM.

In a 46th exemplary aspect of the present disclosure, which may be used in combination with any one or more of the preceding aspects (i.e., the 41st aspect), where a first variable of the at least one variable defining the operating environment of the application includes a location of the application.

In a 47th exemplary aspect of the present disclosure, which may be used in combination with any one or more of the preceding aspects (i.e., the 41st aspect), where the VMM tools emulate hardware accessed by the compact VM. In a 48th exemplary aspect of the present disclosure, which may be used in combination with any one or more of the preceding aspects (i.e., the 41st aspect), where inputs and outputs (I/Os) are sent to the compact VM via the VMM tools incorporated within the application.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A system, comprising:
a host including a memory and a processor, wherein the processor is in communication with the memory; and
a first application and a second application executing on the host;
wherein the processor is configured to:
incorporate, into the second application, virtual machine monitor (VMM) tools and a template compact virtual machine (VM), wherein the second application includes at least one variable defining an operating environment and the template compact VM is for creating a compact VM having an operating characteristic;
dynamically instantiate, via the VMM tools, the compact VM on the host by initializing a kernel embedded in the compact VM based on the at least one variable, and wherein the compact VM is associated with a compact VM identification (ID);
subsequent to the instantiation, receive, at the second application from the first application, a request to modify the operating characteristic of the operating environment of the compact VM, wherein the request includes the compact VM ID, and wherein the operating characteristic affects access rights to the host by the compact VM; and
modify, via the VMM tools, the operating characteristic of the compact VM, wherein the processor is configured to modify the operating characteristic by:
invoking, by the second application, an interface to the VMM tools executing on the host based on an identifier;
determining, by the second application, the compact VM ID associated with the compact VM by querying the VMM tools for the compact VM ID;
requesting, via the interface, access to the compact VM using the compact VM ID; and
updating a connection between the compact VM and associated emulated hardware resources associated with the compact VM.

2. The system of claim 1, wherein the operating characteristic is associated with resources on the host available to the compact VM.

3. The system of claim 1, wherein the operating characteristic is associated with a service executing on the compact VM.

4. The system of claim 1, wherein the compact VM is operable to function without a virtual machine monitor installed on the host.

5. The system of claim 1, wherein modifying the operating characteristic of the compact VM includes modifying a mount-namespace for the compact VM.

6. The system of claim 1, wherein modifying the operating characteristic of the compact VM includes modifying a network-namespace for the compact VM.

7. The system of claim 1, wherein modifying the operating characteristic of the compact VM includes modifying an amount of resources from the host available to be used by the compact VM.

8. A method, comprising:
incorporating, into a second application executing on a host, virtual machine monitor (VMM) tools and a template compact virtual machine (VM), wherein the second application includes at least one variable defining an operating environment and the template compact VM is for creating a compact VM having an operating characteristic;
dynamically instantiating, via the VMM tools, the compact VM on the host by initializing a kernel embedded in the compact VM based on the at least one variable, and wherein the compact VM is associated with a compact VM identification (ID);
subsequent to the instantiation, receiving, at the second application from a first application executing on the host, a request to modify the operating characteristic of the operating environment of the compact VM, wherein the request includes the compact VM ID, and wherein the operating characteristic affects access rights to the host by the compact VM; and
modifying, via the VMM tools, the operating characteristic of the compact VM, wherein modifying the operating characteristic comprises:
invoking, by the second application, an interface to the VMM tools executing on the host based on an identifier;
determining, by the second application, the compact VM ID associated with the compact VM by querying the VMM tools for the compact VM ID;
requesting, via the interface, access to the compact VM using the compact VM ID; and
updating a connection between the compact VM and associated emulated hardware resources associated with the compact VM.

9. The method of claim 8, wherein the operating characteristic is associated with resources on the host available to the compact VM.

10. The method of claim 8, wherein the operating characteristic is associated with a service executing on the compact VM.

11. The method of claim 8, wherein the compact VM is operable to function without a virtual machine monitor installed on the host.

12. The method of claim 8, wherein modifying the operating characteristic of the compact VM includes modifying a mount-namespace for the compact VM.

13. The method of claim 8, wherein modifying the operating characteristic of the compact VM includes modifying a network-namespace for the compact VM.

14. The method of claim 8, wherein modifying the operating characteristic of the compact VM includes modifying an amount of resources from the host available to be used by the compact VM.

15. A non-transitory computer-readable medium comprising program code that is executable by a processing device for causing the processing device to:
incorporate, into a second application executing on a host, virtual machine monitor (VMM) tools and a template compact virtual machine (VM), wherein the second application includes at least one variable defining an operating environment and the template compact VM is for creating a compact VM having an operating characteristic;
dynamically instantiate, via the VMM tools, the compact VM on the host by initializing a kernel embedded in the compact VM based on the at least one variable, and wherein the compact VM is associated with a compact VM identification (ID);
subsequent to the instantiation, receive, at the second application from a first application executing on the host, a request to modify the operating characteristic of the operating environment of the compact VM, wherein the request includes the compact VM ID, and wherein the operating characteristic affects access rights to the host by the compact VM; and modify, via the VMM tools, the operating characteristic of the compact VM, wherein modifying the operating characteristic comprises:
- invoking, by the second application, an interface to the VMM tools executing on the host based on an identifier;
- determining, by the second application, the compact VM ID associated with the compact VM by querying the VMM tools for the compact VM ID;
- requesting, via the interface, access to the compact VM using the compact VM ID; and
- updating a connection between the compact VM and associated emulated hardware resources associated with the compact VM.

16. The non-transitory computer-readable medium of claim 15, wherein the operating characteristic is associated with resources on the host available to the compact VM.

17. The non-transitory computer-readable medium of claim 15, wherein the operating characteristic is associated with a service executing on the compact VM.

18. The non-transitory computer-readable medium of claim 15, wherein the compact VM is operable to function without a virtual machine monitor installed on the host.

19. The non-transitory computer-readable medium of claim 15, wherein modifying the operating characteristic of the compact VM includes modifying a mount-namespace for the compact VM.

20. The non-transitory computer-readable medium of claim 15, wherein modifying the operating characteristic of the compact VM includes modifying a network-namespace for the compact VM.

* * * * *